(12) United States Patent
Warren et al.

(10) Patent No.: US 9,023,160 B2
(45) Date of Patent: May 5, 2015

(54) LATERAL LINER LAUNCHER DEVICE AND METHOD OF INSTALLATION

(75) Inventors: Darcy Warren, Essex (CA); John Bartel, Leamington (CA); Ron Bartel, Wheatley (CA)

(73) Assignee: Liqui-Force Sewer Services Inc., Kingsville, Ontario (CA)

( * ) Notice: Subject to any disclaimer, the term of this patent is extended or adjusted under 35 U.S.C. 154(b) by 240 days.

(21) Appl. No.: 13/576,261

(22) PCT Filed: Jul. 28, 2011

(86) PCT No.: PCT/CA2011/000858
§ 371 (c)(1),
(2), (4) Date: Jul. 31, 2012

(87) PCT Pub. No.: WO2012/016323
PCT Pub. Date: Feb. 9, 2012

(65) Prior Publication Data
US 2012/0291939 A1    Nov. 22, 2012

Related U.S. Application Data

(60) Provisional application No. 61/370,839, filed on Aug. 5, 2010, provisional application No. 61/370,842, filed on Aug. 5, 2010.

(51) Int. Cl.
| | | |
|---|---|---|
| B32B 41/00 | (2006.01) | |
| F16L 55/18 | (2006.01) | |
| F16L 55/165 | (2006.01) | |
| F16L 55/179 | (2006.01) | |
| F16L 55/26 | (2006.01) | |

(52) U.S. Cl.
CPC ............. *F16L 55/18* (2013.01); *F16L 55/1651* (2013.01); *F16L 55/179* (2013.01); *F16L 55/265* (2013.01)

(58) Field of Classification Search
USPC .................... 156/64, 350, 351, 368, 378, 379
See application file for complete search history.

(56) References Cited

U.S. PATENT DOCUMENTS

| 5,971,031 A | 10/1999 | Kamiyama et al. |
|---|---|---|
| 2004/0175235 A1 | 9/2004 | Whittaker et al. |
| 2010/0071487 A1 | 3/2010 | Kampbell et al. |

FOREIGN PATENT DOCUMENTS

JP    7-88962    4/1995

OTHER PUBLICATIONS

International Search Report & Written Opinion for PCT Application No. PCT/CA2011/000858 mailed Oct. 13, 2011.

*Primary Examiner* — Joshel Rivera
(74) *Attorney, Agent, or Firm* — Carlson, Gaskey & Olds, P.C.

(57) ABSTRACT

A launcher assembly includes an outer housing that supports aprons and a nozzle. The nozzle and apron are removable from the base to aid in set up and preparation. Rollers are mounted to ends of the base to aid movement through a sewer pipe. One end of the launcher includes an opening slot for receiving an extended end of the liner. A bladder is banded to a nozzle for inverting the liner. The launcher is held in place by a separately inflatable bellows and pillow. Cameras are mounted to the launcher to provide at least one image on a remote display to aid alignment and installation.

15 Claims, 10 Drawing Sheets

LATERAL LINER LAUNCHER DEVICE AND METHOD OF INSTALLATION

CROSS REFERENCE TO RELATED APPLICATION

This application claims priority to U.S. Provisional Application Nos. 61/370,842 and 61/370,839 both filed on Aug. 5, 2010.

BACKGROUND

This disclosure generally relates to launcher for installing a cured in place pipe. Cured in place pipe (CIPP) methods utilize a resin impregnated liner that is installed within a sewer pipe. Fluid pressure holds the liner against the interior of the old sewer pipe until the resin if full cured. Once the resin is cured, a new pipe is provided in the old pipe. Installation of the liners within laterals pipelines is complicated by the difficulty in accessing the lateral sewer pipe.

Installation of a resin soaked liner within a lateral sewer pipe requires aligning the liner with a lateral a distance away from access points. Moreover, prior to installation of the liner, the lateral sewer is cleaned and inspected. In the past a clean out tube was dug down within the yard to the lateral sewer to provide access for the required preparation. Further, the clean out tube provides a means of aligning the launcher assembly with the desired lateral opening. However, installation of the cleanout tube required excavation in a homeowners or building owners yard. Accordingly, even the small excavation required to install a cleanout is undesirable. The disclosed example method provides a means of aligning a liner for installation within a lateral without a cleanout tube or other excavation.

SUMMARY

A disclosed launcher assembly includes an outer housing that supports aprons and a nozzle. The nozzle and apron are removable from the base to aid in set up and preparation. Rollers are mounted to ends of the base to aid movement through a sewer pipe. One end of the launcher includes an opening slot for receiving an extended end of the liner. A bladder is banded to a nozzle for inverting the liner. The launcher is held in place by a separately inflatable bellows and pillow. The pillow holds a portion of the liner against a surface of the pipe. Prior to installation, the nozzle is raised by the inflatable bellows to raise the nozzle up and partially into the lateral pipe. The inflatable pillow is then inflated to hold the liner in place while the bladder drives the liner into the sewer pipe. Cameras are mounted to the launcher to provide at least one image on a remote display to aid alignment and installation.

These and other features disclosed herein can be best understood from the following specification and drawings, the following of which is a brief description.

DETAILED DESCRIPTION

Figure 1:
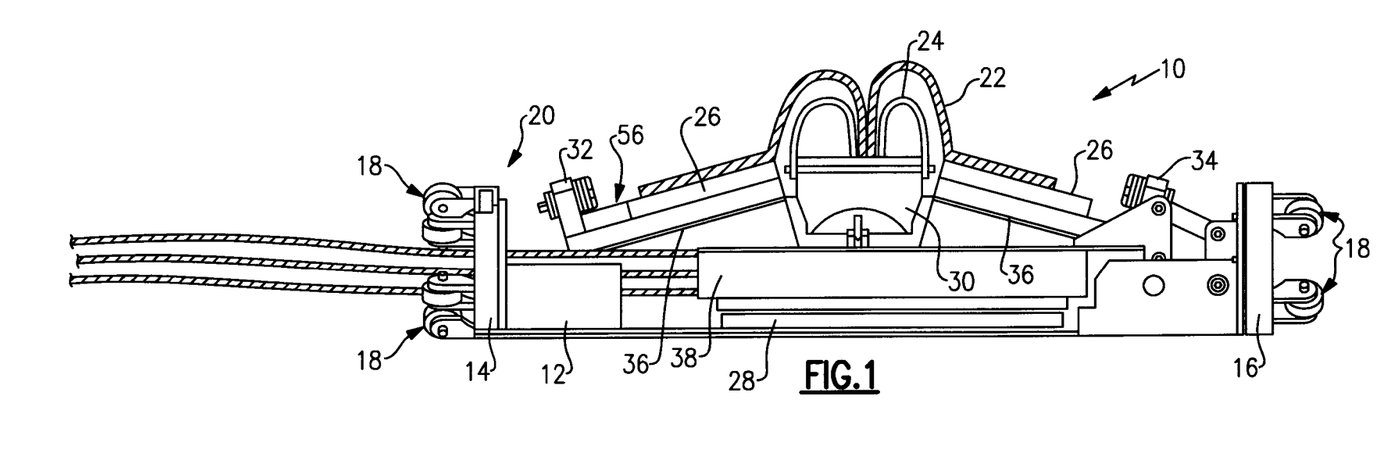
FIG. 1 is a partial sectional view of a disclosed example launcher.
Figure 2:
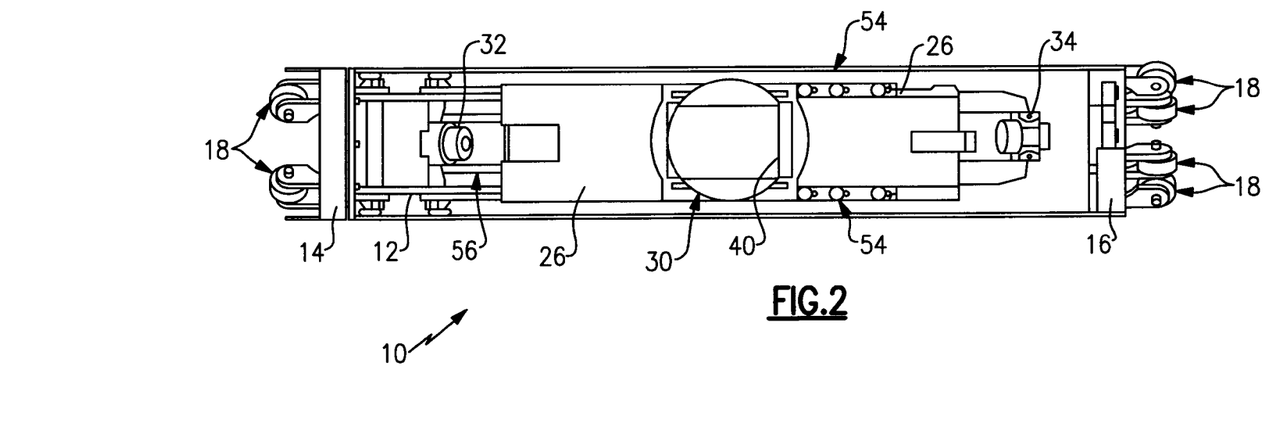
FIG. 2 is a top view of the example launcher.
Figure 14:
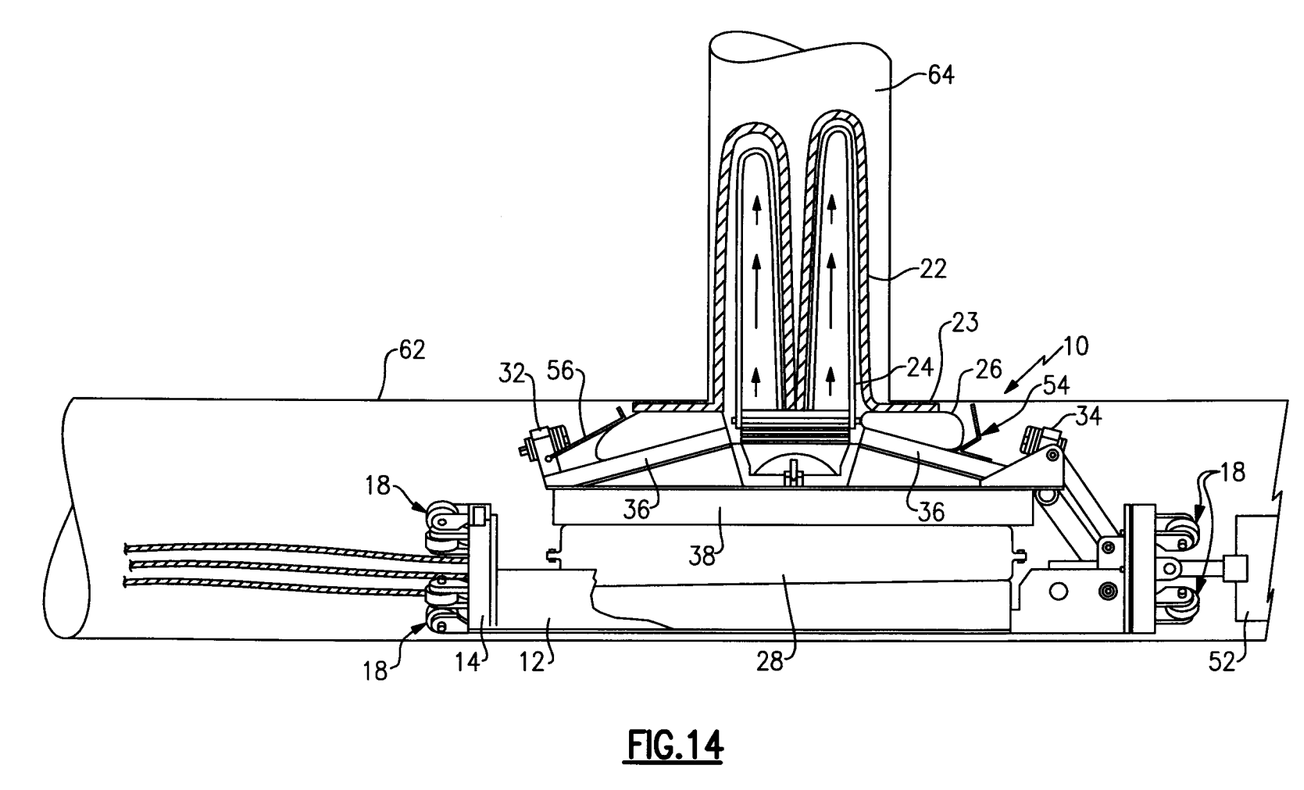
FIG. 14 is a schematic view of the example launcher during a launching operation.

Referring to FIGS. 1 and 2, an example launcher assembly 10 includes an outer housing 12 that extends from a first end 14 to a second end 16. Each of the ends 14 and 16 include rollers 18 to aid movement through a sewer pipe. The first end 14 includes an opening slot 20. The launcher 10 provides for the inversion of a liner 22. The liner 22 is moved through the launcher 10 and into a lateral sewer pipe by inflation of bladder 24. The bladder 24 is banded to a nozzle 30. The liner is 22 is inverted into the lateral sewer pipe by the bladder 24 and held in place against a surface of the main by a pillow 26 that is inflated to hold the liner 22 in place. Prior to inversion, the nozzle 30 is raised by an inflatable bellows 28. The bellows 28 raises the nozzle 30 up and partially into the lateral pipe. The inflatable pillow 26 is then inflated to hold the liner 22 and seal 23 in place while the bladder 24 drives the liner 22 into the lateral sewer pipe (FIG. 14).

A first camera 32 and a second camera 34 are mounted to provide an image on a remote display (FIG. 8) of a relative position of the liner 24 and an opening for a lateral sewer pipe. The cameras 32, 34 are angled upward to provide the desired view of a relative position of the liner 22 in the sewer pipe. The pillows 26 are supported on aprons 36 along with the cameras 32, 34. The aprons 36 are in turn supported on an apron base 38. The apron base 38 also supports the nozzle 30. A chamber 54 beside the bellows 28 is provided to receive a portion of the pillow 26 and the liner 22 during movement to the lateral sewer pipe.

Figures 3, 4, 5, 6:
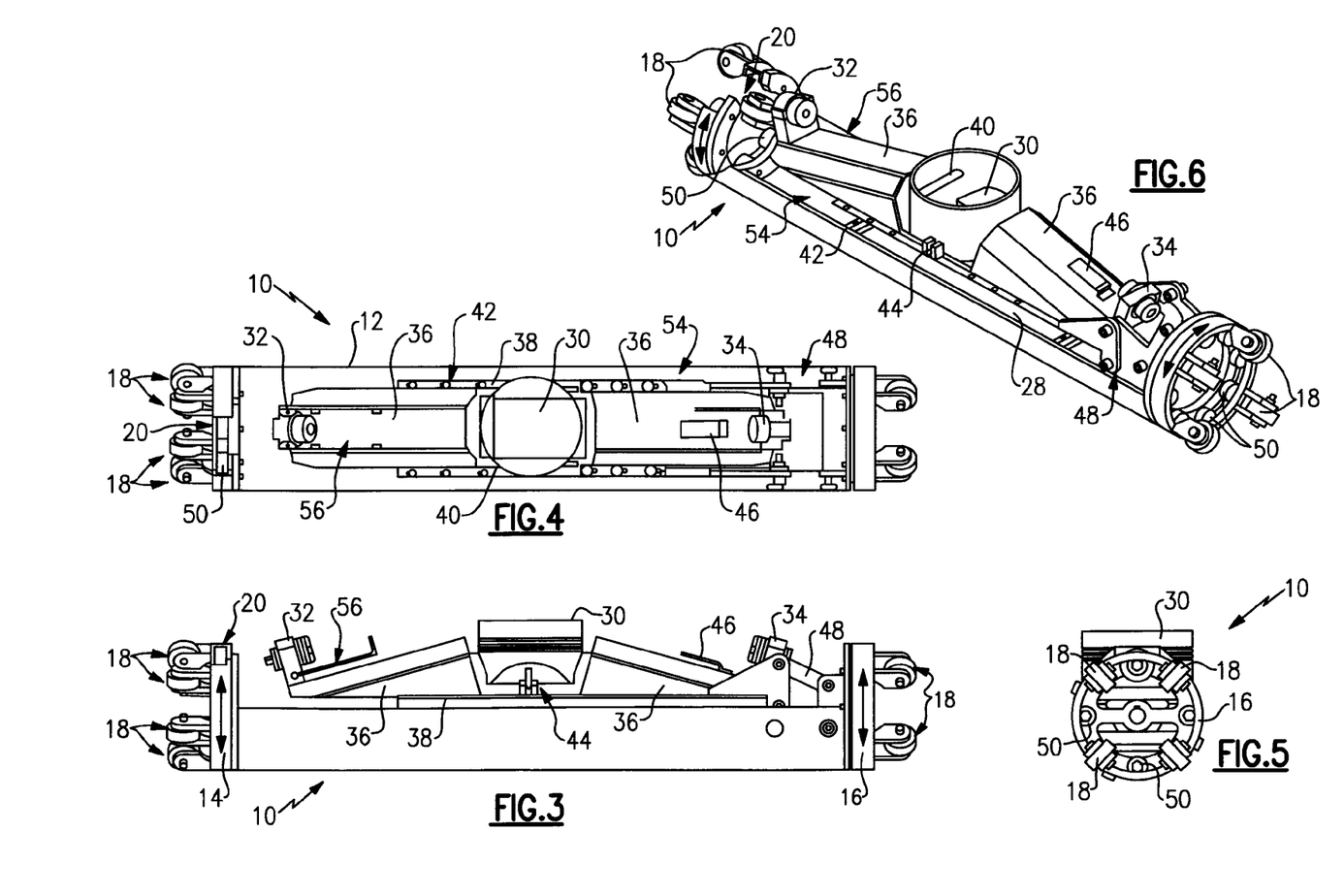
FIG. 3 is a side view of the example launcher.
FIG. 4 is a top view of the example launcher.
FIG. 5 is an end view of the example launcher.
FIG. 6 is a perspective view of the example launcher.

Referring to FIGS. 4-6, the apron base 38 is secured to the outer housing 12 through a scissor linkage 48 that guides relative movement between the outer housing 12 and the apron base 38. In operation, the bellows 28 is inflated to lift the apron base 38 relative to the outer housing 12. Lifting of the apron base 38 is guided upward in a substantially linear fashion by the scissor linkage 48.

Each of the aprons 36 includes a clip 46 for holding the pillow 26 flat during insertion of the launcher 10 within the sewer. The clips 46 are moved clear responsive to inflation of the pillow 26. The clips 46 hold the pillow 26 flat such that the cameras 32, 34 have a substantially unobstructed view of the nozzle 30 and the lateral opening.

The clip 46 can also include a stiff wire member 56 that is attached to a mount holding the camera 32. The stiff wire member 56 is inserted through a portion of the liner 22 (See FIG. 1) to tension and hold the liner 22 down and out of the way of the camera 32. As appreciated, although two wires are shown, multiple wires could also be utilized to hold the liner 22 during movement and alignment with the lateral.

Each of the aprons 36 are attached to the apron base 38 at slotted catches 42. Both or one of the aprons 36 can be removed from the apron base 38 to facilitate installation of the liner 24 into the launcher 10. Moreover, the nozzle 30 is fixed to the apron base 38 by a latch 44 that provides for removal of the nozzle 30. As shown in FIG. 1, the bladder 24 is banded to the nozzle 30. The banding can be accomplished separate of the launcher 10 to each and speed installation and set up. The slot opening 20 also aids in laying the liner 22 into the launcher 10 during set up. The nozzle 30 also includes a guide surface 40 that aids movement of the bladder 24 and liner 22 through the nozzle 30 during inversion. In this example, the guide surface 40 is a roller shaft. The guide surface 40 could also include just a curved surface with rounded edges to prevent snagging of the liner during installation.

Referring to FIG. 5, the end 16 is rotatable on inner rollers 50 to further aid movement of the launcher 10 within the sewer pipe. The end 16 rotates such that the launcher 10 can rotate within the main to position the nozzle relative to the lateral opening.

Figure 7:
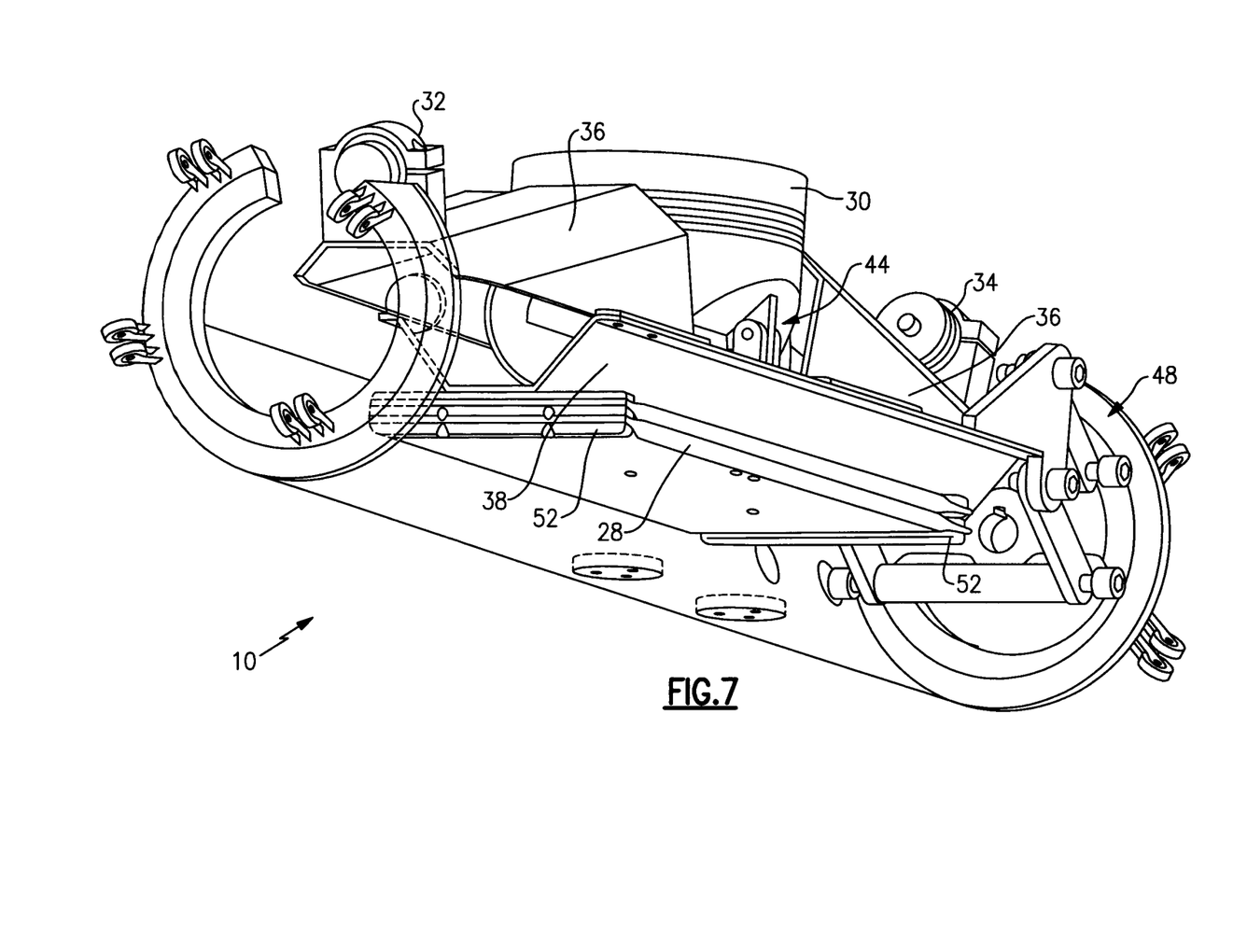
FIG. 7 is a perspective view of the internal portions of the example launcher.

Referring to FIG. 7, the example launcher 10 is shown without the outer housing 12 to shown the bellows 28. The bellows 28 includes end clamps 52 that provide an airtight seal that facilitates inflation. Inflation of the bellows 28 presses against the outer housing 12 to lift the apron base 38 upwardly. Alignment of the apron base 38 is maintained during inflation by the scissors linkage 48. The scissor linkage 48 is attached to the outer housing 12 (FIGS. 3 and 4) and the apron base 38. The nozzle 30 defines a passage for the bladder 24 and the liner 22 along with the apron base 38 and the apron 36. The apron 36 includes an angled surface that provides the desired angle for the camera 32. The desired angle provides for viewing of the nozzle 30 and liner 22 along with the surface of the sewer pipe to aid alignment for inversion.

Figure 8:
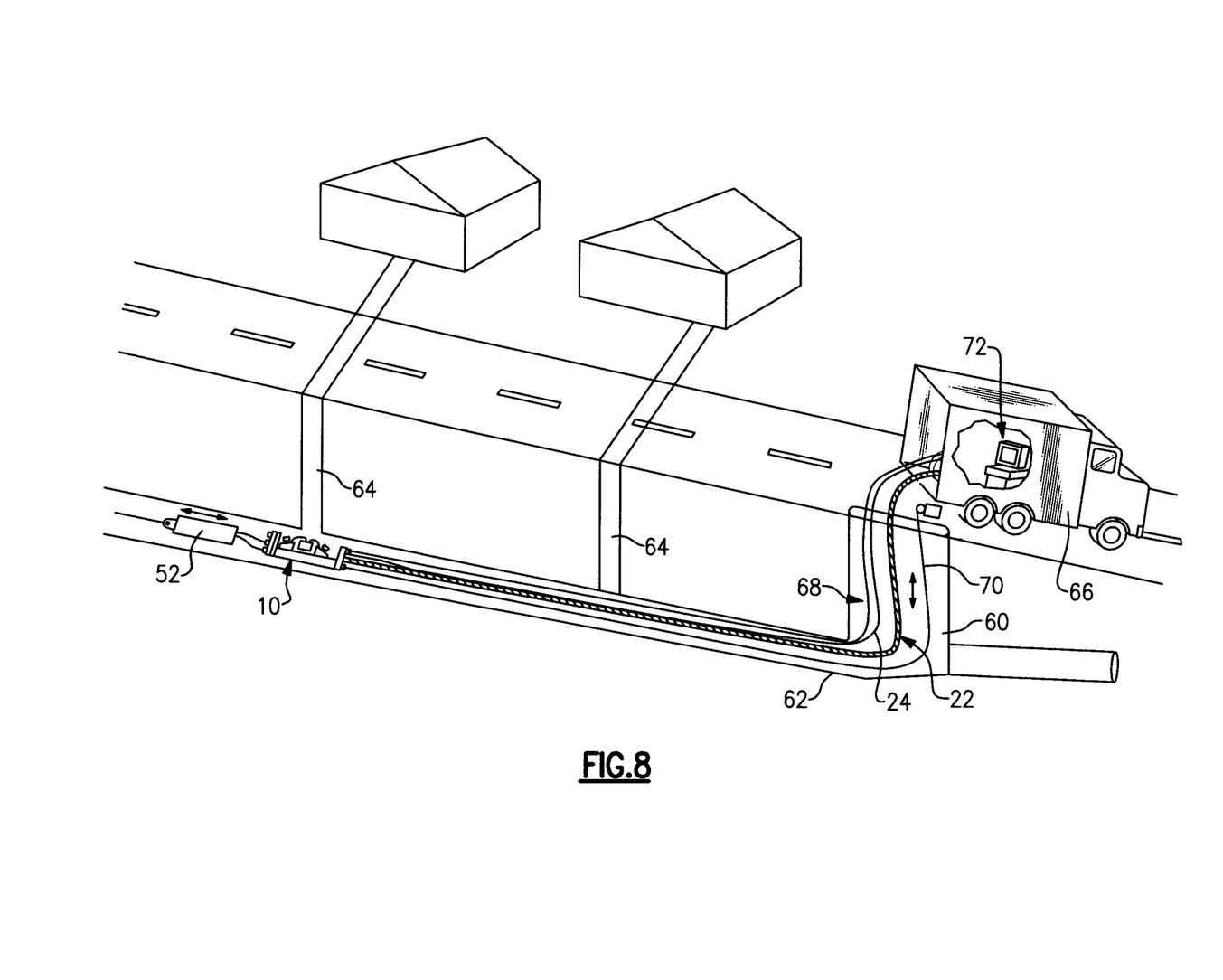
FIG. 8 is a schematic representation of a sewer system including a main sewer pipe and a several lateral sewer pipes.

Referring to FIG. 8, a schematic view of an example sewer system is shown and includes a manhole 60 that provides access to a mainline 62. Leading into the main line are a plurality of branch lines from each home or building known as laterals 64. A support vehicle 66 includes a controller 72 for monitoring and controlling installation. The example launcher 10 is shown within the mainline 62. A number of laterals 64 extend into the mainline 62. The launcher is driven by a tow machine 52 into a desired position. A cable 70 is driven by a winch to further aid movement of the launcher 10 through the mainline 62. Control over the launching operation is provided by the controller 72 supported within the support vehicle 66. A set-up operation is performed to ready the launching device 10 for installing the liner 22 prior to being inserted within the mainline sewer.

Figure 9:
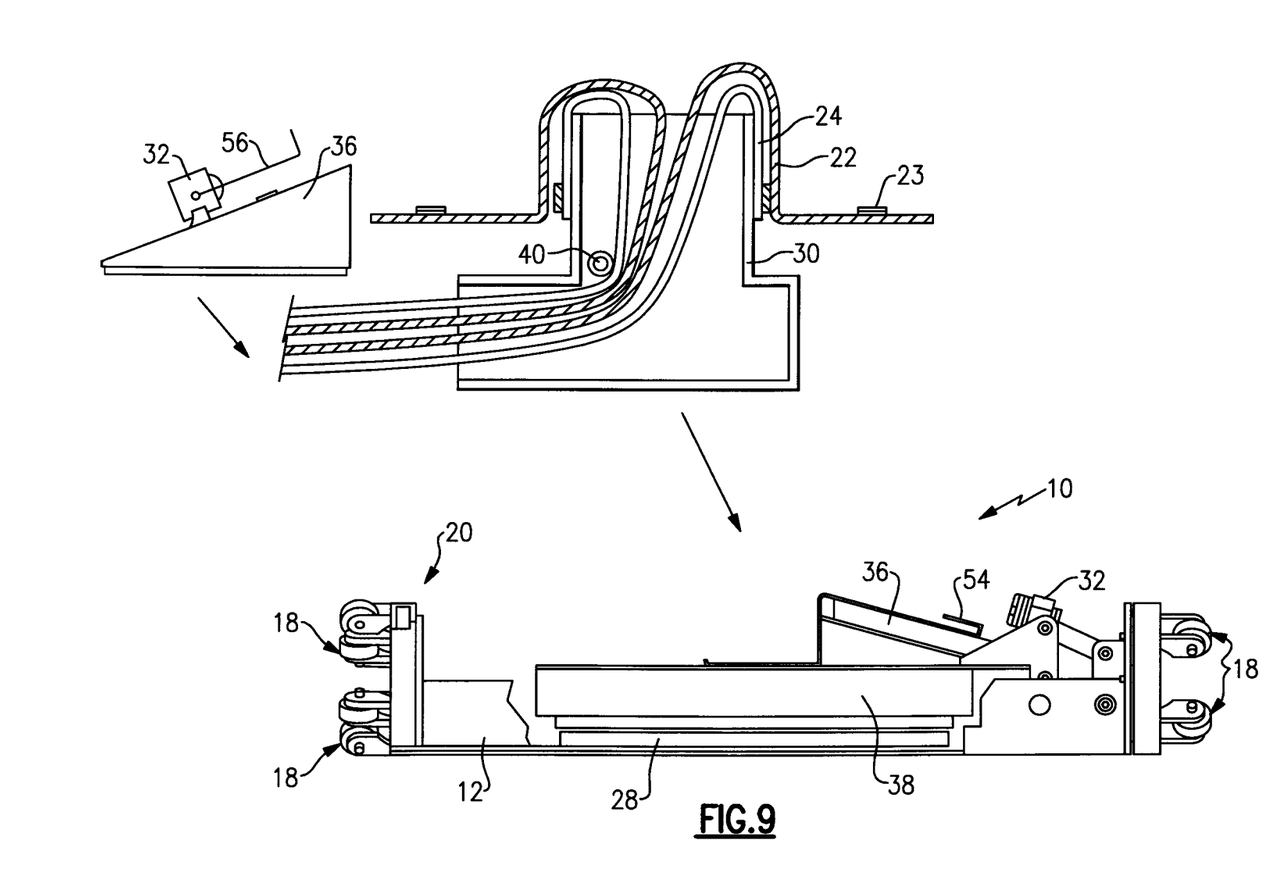
FIG. 9 is a schematic view of the example launcher partially disassembled to provide for mounting of a liner and bladder.

Referring to FIG. 9, the set-up operation includes removing the nozzle assembly 30 and one of the aprons 36. The nozzle 30 is removable from the launcher 10 such that the bladder 24 and liner 22 can be extended through the passageway defined by the nozzle 30. The nozzle 30 also includes rollers 40 that reduce resistance to movement of the liner 22 and bladder 24 through the passageway defined by the nozzle 30.

The liner 22 and bladder 24 are much longer than the launcher 10 and extend back out of the man hole 60 as is shown in FIG. 8. Therefore an opening 20 is provided in the launcher 10 such that the bladder 24 and liner 22 can be fit into the launcher 10 without having threading through a small opening. Once the bladder 24 and liner 22 are attached to the nozzle 30, the nozzle 30 is secured to the launcher 10 by way of latch couplings (not shown). Similarly, the apron 36 is reattached by way of the slotted connection with the apron base 36.

Figure 10:
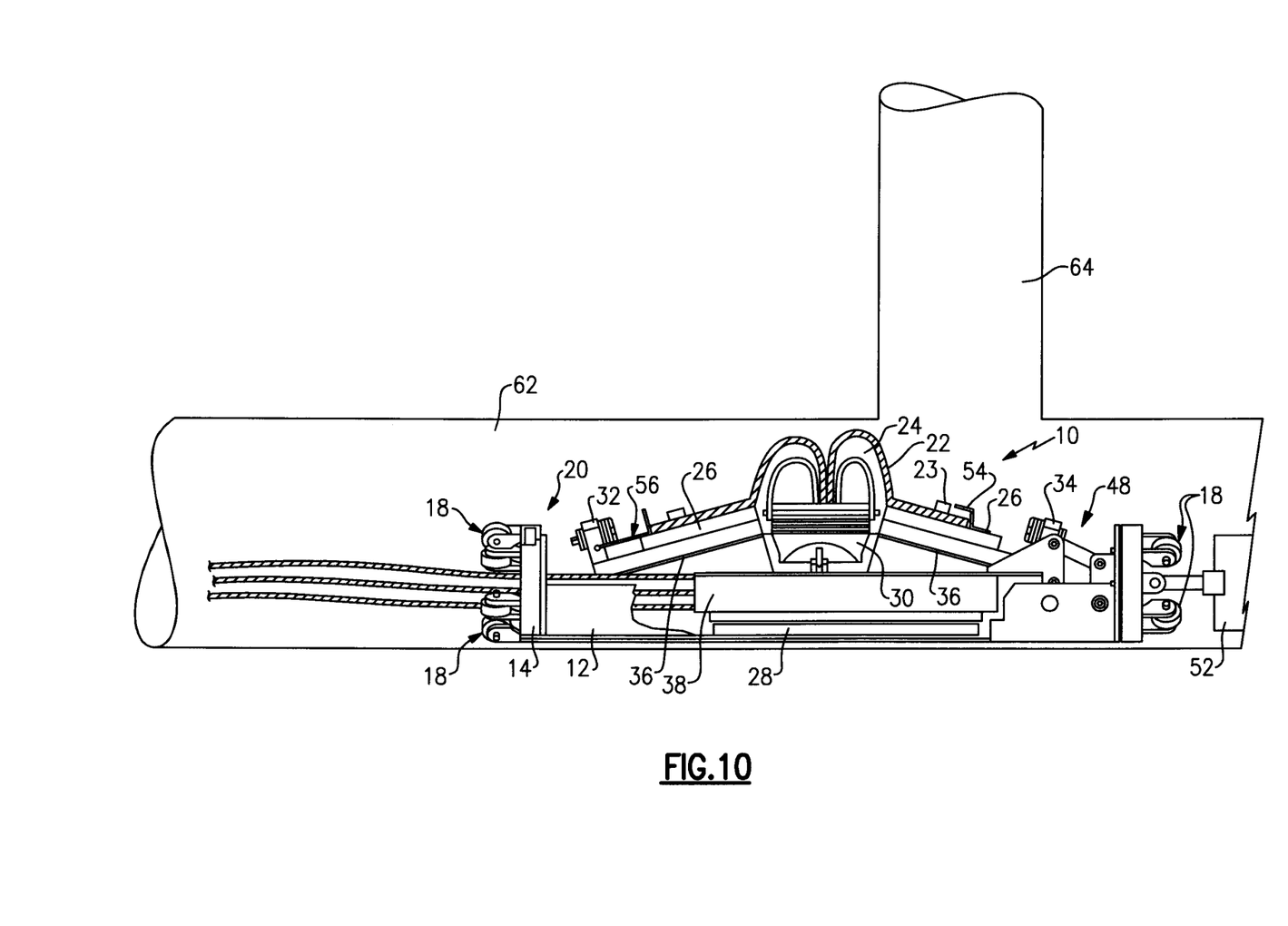
FIG. 10 is a sectional view of an example launcher being installed within a sewer pipe.

Referring to FIG. 10, the readied launcher 10 is placed within the main 15 and moved towards a desired aligned position with the lateral. The disclosed launcher 10 does not include a mechanism for moving it itself and therefore relies on a machine or cable to pull the launcher in place. In this example a tow machine 52 is utilized, however, a series of cables could also be utilized to move the launcher 10 into place.

A pillow 26 is supported on the aprons 36 and holds portions of the liner 22 and seal 23 against the inner surface of the main 15. The pillow 26 and liner 22 are held in place by clips 54. The pillow and liner 22 could also be held in place by wires 56. The wires 56 are inserted through a portion of the liner 22 to tension and hold the liner 22 such that it does not restrict vision of the camera 32. Moreover, in this example two wires 56 are shown, however more wires as are required could be utilized at various locations about the liner 22 to hold the liner 22 and seal 23 in a desired position during the alignment process.

During movement of the launcher 10 within the main, the pillow 26 and the liner 22 are held clear of the view provided by the cameras 34. This provides for an unobstructed view of the nozzle 30 and portions of the liner 22 along with internal surfaces of the main 15, thereby providing a clear view to align the launcher 10 and specifically the nozzle 30 with the opening in the lateral. A chamber 58 is disposed between the base apron 38 and the outer housing 16. Portions of the liner 22 and the pillow 26 are received within this chamber 58 to safeguard the liner 22 and pillow 26 during movement through the sewer. Moreover, the chamber 58 provides a place for the liner 22 and pillow 26 that does not obstruct view of either camera 32, 34.

Figure 11:
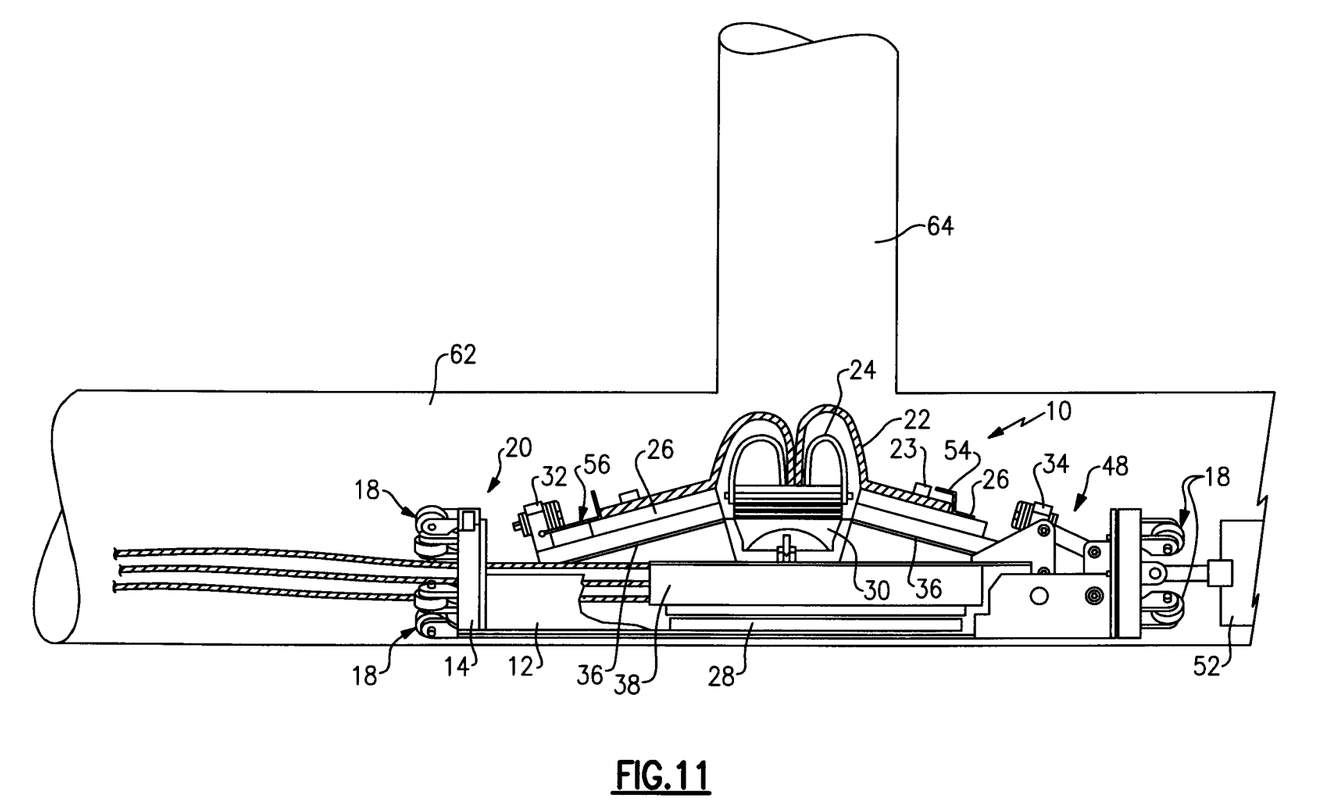
FIG. 11 is a sectional view of an example launcher being aligned with the lateral sewer pipe.

Referring to FIG. 11, the example launcher 10 is shown aligned with the opening in the lateral. This position is obtained using the images displayed and provided by each of the two cameras 32. Each camera 32 provides a view of an edge of the opening of the lateral relative to the position of the nozzle 30. Views of each edge of the lateral provide the desired images that allow an operator viewing a display to properly align the launcher 10 with the lateral. Traditional methods utilized a camera threaded through a cleanout tube into the lateral to view the launcher as it passed by the opening. The disclosed method eliminates the need for such a separate camera.

Figure 12:
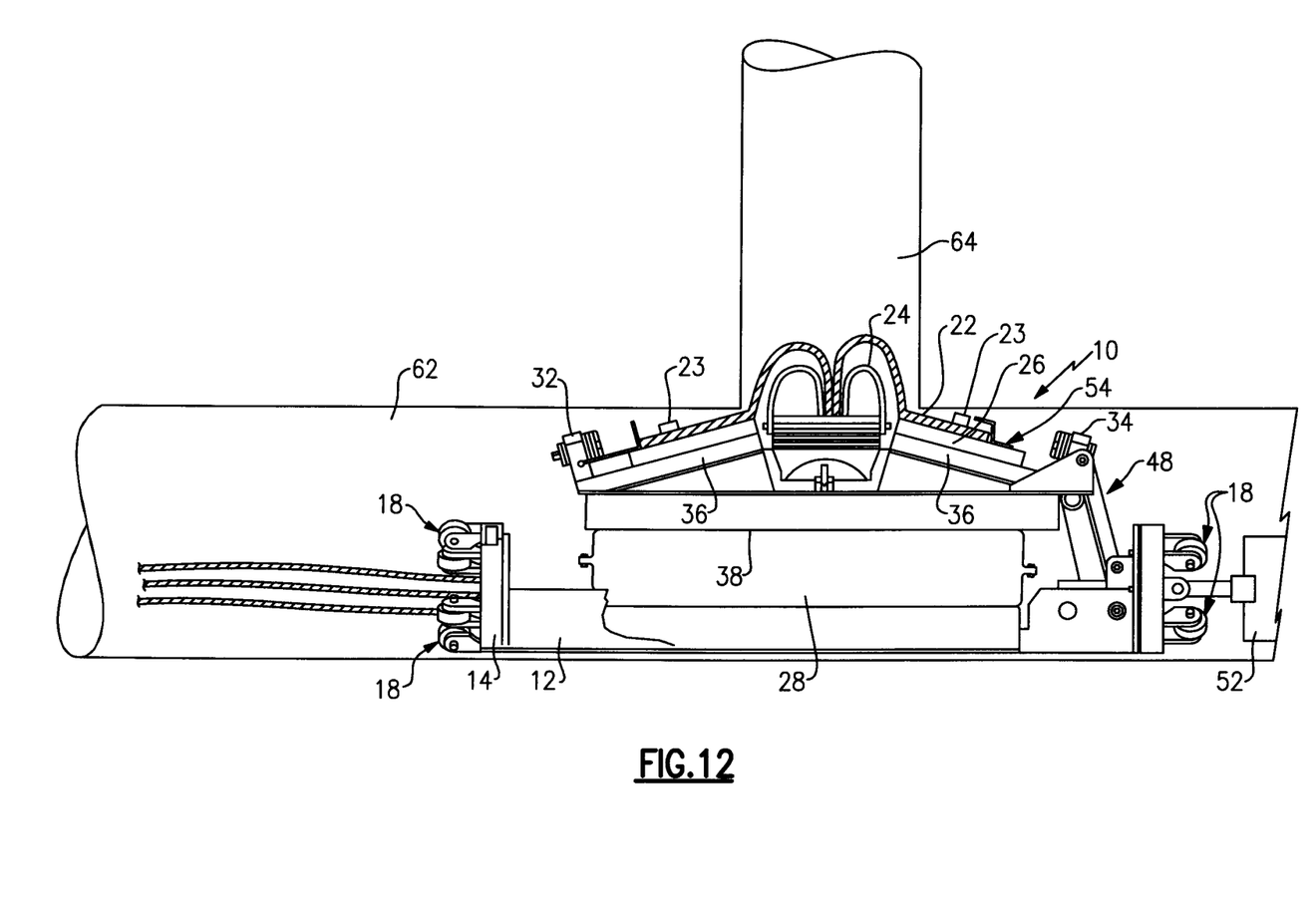
FIG. 12 is a schematic view of the example launcher being inflated to a first position.

Referring to FIG. 12, once aligned, the bellows 28 is inflated to a position that moves the base apron 38 upward towards the opening of the lateral. The upward movement is provided by inflation of the bellows 38 and guided by the linkage 48. The example swivel linkage 48 includes arms that are attached between the housing 16 and the base apron 38. The example swivel linkage 48 comprises a four bar mechanism, however other linkages that will provide and maintain a desired alignment of the base apron 38 relative to the housing 16 of the launcher 10 are also within the contemplation of this disclosure. The example bellows 28 comprises at least one air chamber that is separately inflatable from the bladder 24 and pillow 26 assembly also disposed on the launcher assembly 10. Once the bellows 28 is inflated to move the nozzle 30 into a desired position, installation proceeds by inflating the pillow 26.

Figure 13:
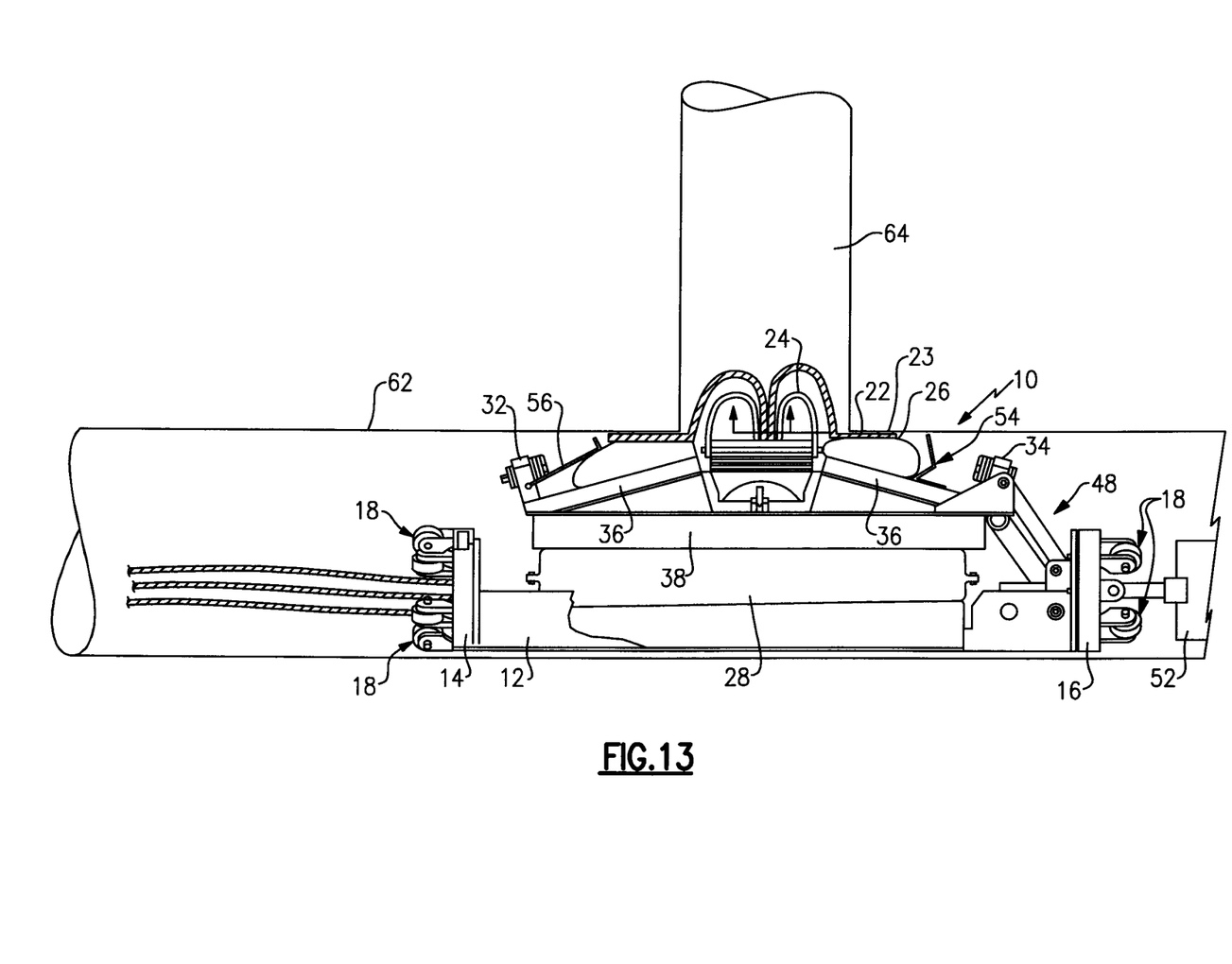
FIG. 13 is a schematic view of the example launcher being placed in a condition ready for liner installation.

Referring to FIG. 13, the pillow 26 is inflated and presses a portion of the liner 22 and seal 23 against the inner surfaces of the main 15. The pillow 26 acts against the aprons 36 to push ends of the liner 22 and seal 23 upward against the internal surface of the main 15. The cameras 32 transmit images of the pillow inflation to a remotely located operator such that a desired fit and hold of the liner 22 and seal 23 by the pillow 26 can be viewed and verified.

Referring to FIG. 14, once the liner 22 and seal 23 is seated against the inner surface of the main 15, the bladder 24 is actuated by injecting pressurized air to invert the bladder 24 and liner 22 from the launcher 10 by way of the passage defined by the nozzle 30. The bladder 24 and liner 22 move upwardly into the lateral 14 such that the liner 22 is held against an inner surface of the lateral 14 once the bladder 24 is fully inflated.

Once fully inflated, the bladder 24 remains inflated to press the liner 22 against the interior surfaces of the lateral 14. Once the liner 22 is cured to form a hardened liner or new pipe within the lateral 14, the bladder 24 is deflated and removed. The deflated bladder 24 is pulled clear of the lateral using a rope or other line attached to terminal end of the bladder 24.

The pillow 26 and bellows 28 are also deflated to facilitate removal of the launcher 10. Deflation of the pillow 26 and the bellow 28 move the nozzle 30 back completely into the main 15. As appreciated, simply exhausting air from the bellows 28 may not provide the desired full collapse of the apron base 38. Therefore, a vacuum is applied to the bellows 28 to fully collapse and retract the base apron 38 away from, and out of the lateral 14. In this disclosed method, complete collapse of the bellows 28 is desired so that the nozzle 30 can clear the lateral 14. Once collapsed, the launcher 10 is removed from the main 15 and prepared for installation of the next liner 22.

Accordingly, the disclosed method of launching a lateral cured in place pipe liner provides for installation entirely from the main without utilizing external cameras to align and ensure proper seating of the liner. Moreover, removing the need for external cameras also removes the need for excavation to install a cleanout. The example launcher 10 provides improved visibility for aligning a lateral liner such that additional or external cameras are not required. Moreover, the elimination of secondary cameras provides for installation without the need for a clean out or other external opening for aligning the liner with the lateral opening.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A launcher assembly comprising:
a nozzle defining a passage for a liner into an opening of a main sewer pipe into a lateral sewer pipe;
a base supporting the nozzle;
a bellows supported on the base and inflatable to move the nozzle into an installation position;
an inflatable pillow for holding a portion of the liner against a surface of the main sewer pipe; and a camera supported on the base for providing an image of a relative position of the launcher assembly relative to the opening in the sewer pipe.

2. The assembly as recited in claim 1, wherein the nozzle is removable to facilitate set up.

3. The assembly as recited in claim 1, including a second camera mounted to the base for providing a second image of a relative position of the launcher assembly relative to the opening in the sewer pipe.

4. The assembly as recited in claim 1, including a first and second aprons supported on an apron base attached to the base.

5. The assembly as recited in claim 4, wherein at least one of the first and second aprons is removable from the base to facilitate set up.

6. The assembly as recited in claim 4, including a linkage attached to the apron base for maintaining a desired alignment of the nozzle and base during inflation of the bellows.

7. The assembly as recited in claim 2, wherein the base includes first and second ends supporting rollers for guiding through a pipe.

8. The assembly as recited in claim 7, including a slot formed in at least one of the first and second ends to facilitate set up assembly of a liner prior to installation.

9. The assembly as recited in claim 1, including a roller disposed within the nozzle for guiding a liner through the passage.

10. A method of installing a cured in place pipe liner comprising:
securing a pipe liner to a nozzle defining a passage through a launching device into an opening a main sewer pipe into a lateral sewer pipe;
aligning the nozzle with an opening in a sewer pipe with at least one camera supported on the launching device;
inflating a bellows to move the pipe liner toward the opening in the sewer pipe;
inflating a pillow for holding a portion of the pipe liner against a surface of the main sewer pipe; and
driving the pipe liner into through the passage defined by the nozzle with a bladder inflated independent of the bellows and the pillow.

11. The method as recited in claim 10, wherein the alignment step is conducted utilizing only the at least one camera mounted to the launching device.

12. The method as recited in claim 10, including a first camera for viewing a first edge of the opening to the sewer pipe and a second camera for viewing a second edge of the opening in the sewer pipe for aligning the nozzle and the step of aligning the nozzle includes viewing each edge of the opening on a screen remote from the launching device.

13. The method as recited in claim 10, including holding down a portion of the pipe liner with a clip secured to the launching device, and disengaging the clip responsive to inflation of the pillow.

14. The method as recited in claim 10, including the step of applying a negative pressure for collapsing the bellows and the pillow once installation is complete.

15. The method as recited in claim 10, including the step of guiding a portion of the launching device with a linkage mechanism during inflation of the bellows.

* * * * *